United States Patent [19]

Albertini

[11] 4,377,291
[45] Mar. 22, 1983

[54] SEALING ASSEMBLY

[75] Inventor: Francis G. Albertini, Arlington, Mass.

[73] Assignee: The United States of America as represented by the Secretary of the Air Force, Washington, D.C.

[21] Appl. No.: 368,784

[22] Filed: Jan. 15, 1982

[51] Int. Cl.³ .................. F16J 15/18; F16L 39/00
[52] U.S. Cl. ............................. 277/105; 285/137 R
[58] Field of Search .................. 285/137 R, 137 A; 277/102, 105

[56] References Cited

U.S. PATENT DOCUMENTS

| 2,181,664 | 11/1939 | Melzer | 285/137 R |
|---|---|---|---|
| 2,517,717 | 8/1950 | Rose | 285/137 R |
| 2,845,286 | 7/1958 | Case et al. | 277/105 |
| 3,135,535 | 6/1964 | Shepard | 285/137 R |
| 3,582,096 | 6/1971 | Norton | 285/137 R |
| 3,652,098 | 3/1972 | Kawazu | 277/105 |
| 3,889,986 | 6/1975 | Cheshir et al. | 285/137 R |
| 3,895,830 | 7/1975 | Madlem | 285/137 R |

Primary Examiner—Robert I. Smith
Attorney, Agent, or Firm—Donald J. Singer; Willard R. Matthews

[57] ABSTRACT

A mechanical sealing assembly for establishing a watertight, rodent/insect-proof seal between a plurality of elongated members (e.g., cables, tubes, etc.) and a conduit carrying the elongated members. The sealing assembly includes a resilient, compressible, cylindrical rubber bushing and a pair of flat plates on opposite sides of the bushing. The bushing has a plurality of longitudinal receiving openings therein and a plurality of radial slots extending from the perimeter of the bushing into the receiving openings for enabling the elongated members to be forcibly inserted by way of the slots into the receiving openings. Each of the flat plates includes several sections which are assembled together in an interlocking fashion to surround the elongated members and define openings for the passage therethrough of the elongated members. The assembly of the bushing and plates having the elongated members passing therethrough are inserted into the conduit, and the two plates are drawing toward each other by bolts passing through the assembly to cause the bushing to be compressed between the two plates and expand at its perimeter to effect a seal between the bushing and the conduit and also to contract around the elongated members to effect seals between the bushing and the elongated members.

20 Claims, 6 Drawing Figures

SEALING ASSEMBLY

The invention herein described was made in the course of a contract with the Department of the Air Force.

FIELD OF THE INVENTION

The present invention relates to a sealing assembly and, more particularly, to a mechanical sealing assembly for providing a water-tight, rodent/insect-proof seal between a plurality of cables or tubes and an enclosure for said cables or tubes.

BACKGROUND OF THE INVENTION

There are many applications in which it is necessary or desirable to connect cables or metal tubes buried within the foundation of a structure or located within an underground manhole or vault to equipment or apparatus located at substantial distance away from the point at which the cables or tubes emerge from the foundation, manhole or vault. A common practice is to place the cables or tubes within and along a hollow plastic, metal or concrete conduit, which itself may be cast within the foundation, manhole or vault, and, at the point at which the cables or tubes emerge from the conduit, to seal the openings or spaces between the cables or tubes and the conduit. The sealing of the conduit serves to minimize the entry of water or other liquids into the conduit and also to minimize or prevent penetration of the seal by underground pests such as rodents and insects. The rodent problems can be especially severe in the case of buried electrical and fiber optic cables.

The sealing of the openings or spaces between cables or tubes and the associated conduit as described hereinabove can generally be accomplished by the use of a standard sealing compound, for example, of the mastic type or, alternatively, by the use of commercially-available mechanical sealing assemblies. If a sealing compound is used, it is generally stuffed into the openings or spaces between the cables or tubes themselves and the conduit and allowed to harden. This technique has the disadvantage of being a permanent solution and thus may be impractical if it later becomes necessary to re-route or relocate the cables or tubes or to make other changes (e.g., repairs) to the cables or tubes. In these latter cases, destruction of the seal is generally necessary. This type of seal also falls short in its ability to resist penetration by rodents and other pests.

Commercially-available sealing assemblies generally take the form of a threaded fitting attached to the conduit, a rubber bushing through which the cables or tubes are end fed, and a threaded end cap which surrounds the rubber bushing and is screwed onto the fitting, causing the rubber bushing to compress around the cables or tubes and effect a seal between the cables or tubes and the conduit. This type of sealing assembly has the major disadvantage of requiring the cables or tubes to be end fed through the rubber bushing, an operation which can be a great inconvenience if the cables or tubes are to be fed to other than a nearby location, for example, to a location several hundred feet away from the point at which the cables or tubes emerge from the conduit. In addition, small openings or spaces between and around the cables or tubes themselves can still remain, enabling water or other liquids or pests to enter by way of these openings or spaces into the conduit.

BRIEF SUMMARY OF THE INVENTION

In accordance with the present invention, a mechanical sealing assembly is provided which avoids the shortcomings and disadvantages of prior art seals as discussed hereinabove.

The mechanical sealing assembly in accordance with the present invention includes a bushing of a resilient, compressible material. This bushing has a plurality of receiving openings extending therethrough and a plurality of slots extending from and between the perimeter of the bushing and the receiving openings. The slots are arranged to be widened for permitting a plurality of elongated members, such as electrical cables, tubes or rods, to be inserted into, and to lie longitudinally within and pass through, the receiving openings. The elongated members themselves are conducted along, and emerge from, a hollow enclosure such as a conduit. The above-mentioned bushing has a shape generally conforming to the interior configuration of the hollow enclosure.

The bushing of the mechanical sealing assembly is used in conjunction with first and second plates. These plates are adapted following the insertion of the elongated members into the receiving openings in the bushing to be positioned on opposite sides of the bushing thereby to sandwich the bushing between the plates. Each of the plates comprises a plurality of interconnecting sections arranged to surround the elongated members and defining openings corresponding to the receiving openings in the bushing for the receipt therein and passage therethrough of the elongated members. The sandwich assembly of the first and second plates and the bushing having the elongated members passing therethrough is adapted to be inserted into the enclosure. Following the insertion of the sandwich assembly into the enclosure, a compression means operates to longitudinally compress the bushing between the first and second plates by an amount to cause the bushing to expand outwardly at its perimeter thereby to effect a seal therebetween and the enclosure and to cause the bushing to contract around the elongated members thereby to effect seals between the bushing and the elongated members.

DETAILED DESCRIPTION OF THE INVENTION

Figure 1:
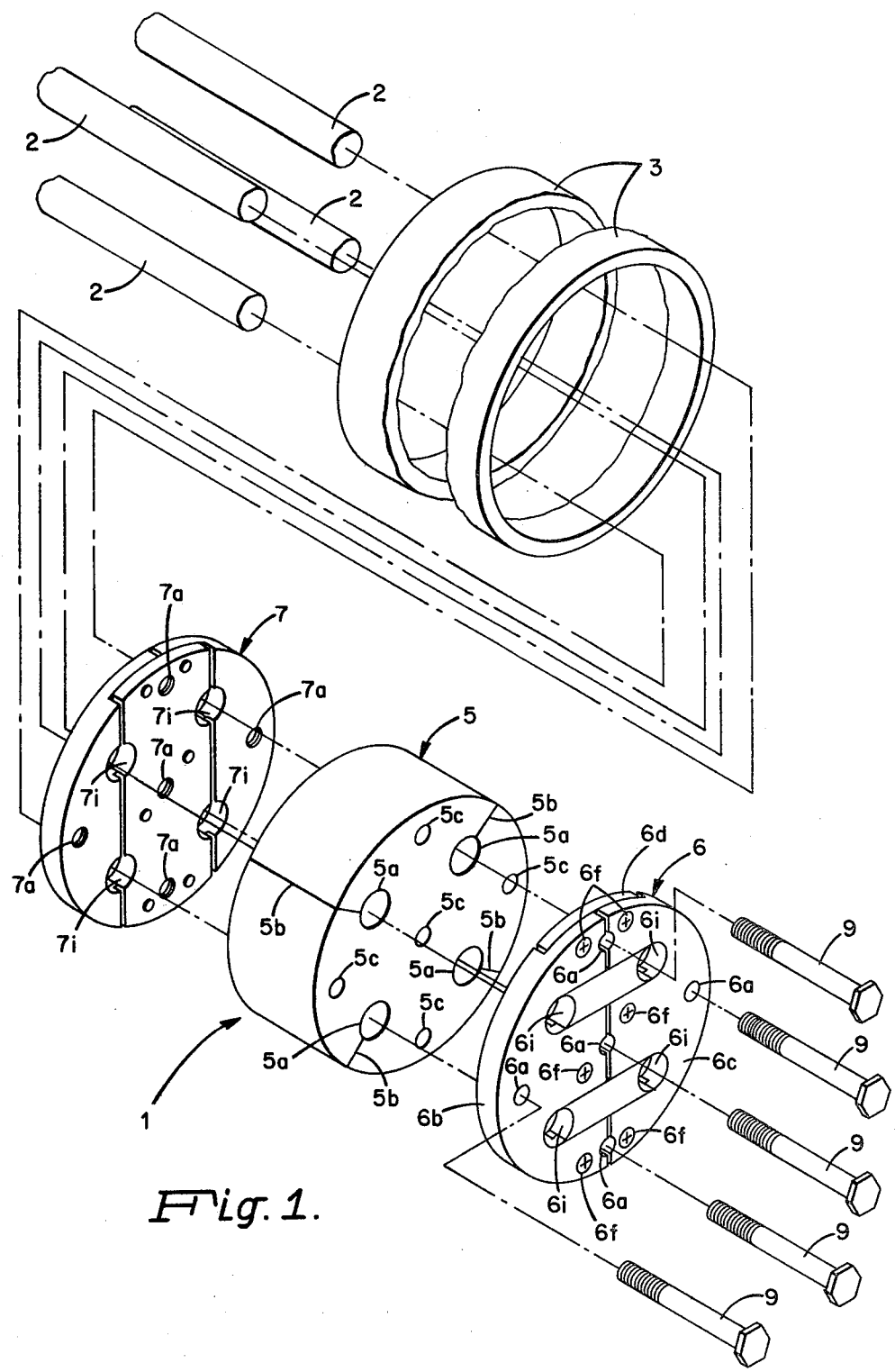
FIG. 1 is an exploded perspective view of a mechanical sealing assembly in accordance with the present invention.
Figure 2:
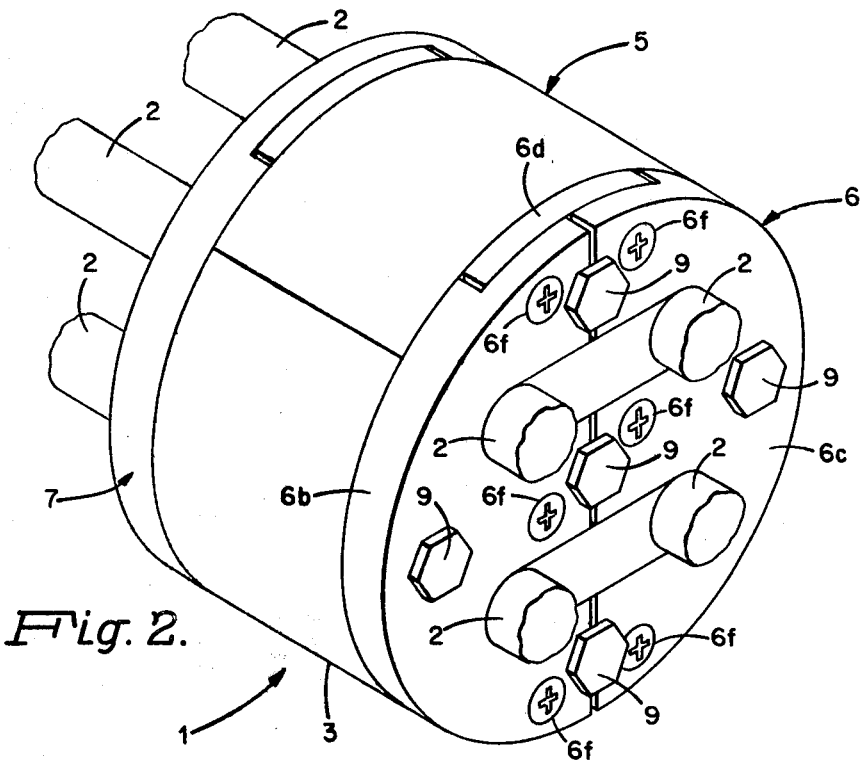
FIG. 2 is a perspective view illustrating the mechanical sealing assembly of FIG. 1 in its assembled state prior to insertion into a conduit.

Referring now to FIG. 1, there is shown an exploded perspective view of a mechanical sealing assembly 1 as employed in accordance with the invention for establishing a water-tight, rodent/insect-proof seal between a plurality of elongated, generally-cylindrical members 2 and an enclosure 3. The mechanical sealing assembly 1 is shown in FIG. 2 in its assembled state prior to insertion into the enclosure 3. The elongated, generally-cylindrical members 2 as shown in FIG. 1 may take the form of cables (e.g., electrical or fiber optic) or solid or hollow rods or tubes of generally circular cross section. The enclosure 3 as shown in FIG. 1 may be a standard cylindrical, plastic, concrete or metal tube or conduit of generally circular cross section.

As shown in FIGS. 1 and 2, the sealing assembly 1 generally comprises a cylindrical bushing 5 and front and rear multi-section plates 6 and 7 arranged on opposite faces or sides of the bushing 5. The bushing 5 and the plates 6 and 7 are secured together to form a unitary assembly by means of a plurality (e.g., five) of threaded bolts or fasteners 9 which pass through the front plate 6 and the bushing 5 and thread into the rear plate 7.

The bushing 5 is best shown in FIG. 1 and comprises a first set of equi-spaced circular openings 5a equidistant from the center of the bushing and through which the aforementioned elongated members 2 are arranged to pass; a plurality of narrow radial slots or cuts 5b extending from and between the circumference or perimeter of the bushing 5 and the openings 5a; and a second set of equi-spaced circular openings 5c through which the aforementioned bolts 9 are arranged to pass for securing the plates 6 and 7 and the bushing 5 together to form a unitary assembly. The radial slots 5b provided in the bushing 5 are utilized in the general manner shown in FIG. 6, to be described in greater detail hereinafter, for enabling the elongated members 2 to be positioned longitudinally within their respective openings 5a at such time as the assembly 1 is to be positioned within the conduit 3 for effecting a seal between the assembly 1 and the conduit 3. As will also be explained hereinafter, the bushing 5 is further adapted to be compressed between the plates 6 and 7 following the insertion of the assembly 1 into the conduit 3 so as to establish a tight seal around and between the elongated members 2 and also between the bushing 5 and the conduit 3. For this reason, and also for enabling the elongated members 2 to be placed within their respective openings 5a in the bushing 5 as briefly mentioned hereinabove, the bushing 5 is selected to be of a compressible, resilient, firm material such as silicone rubber. The diameter of the bushing 5 prior to being inserted into the conduit 3 and prior to being compressed between the plates 6 and 7 is selected to be slightly less than the inside diameter of the conduit 3. The diameters of the plates 6 and 7 are also selected to be slightly less than the inside diameter of the conduit 3.

Each of the aforementioned plates 6 and 7 comprises multiple sections, specifically, three sections, which are arranged together in an interlocking fashion as generally indicated in FIGS. 1-5 to form unitary structures. The two plates 6 and 7 are of basically the same construction, differing from each other only in that the front plate 6 has a set of unthreaded openings 6a for the receipt and passage of the bolts 9, and the rear plate 7 has a corresponding set of openings 7a (see FIG. 1) which are threaded and into which the bolts 9 are threaded. For pusposes of explaining the present invention, only the front plate 6 will be described herein in detail.

Figure 5:
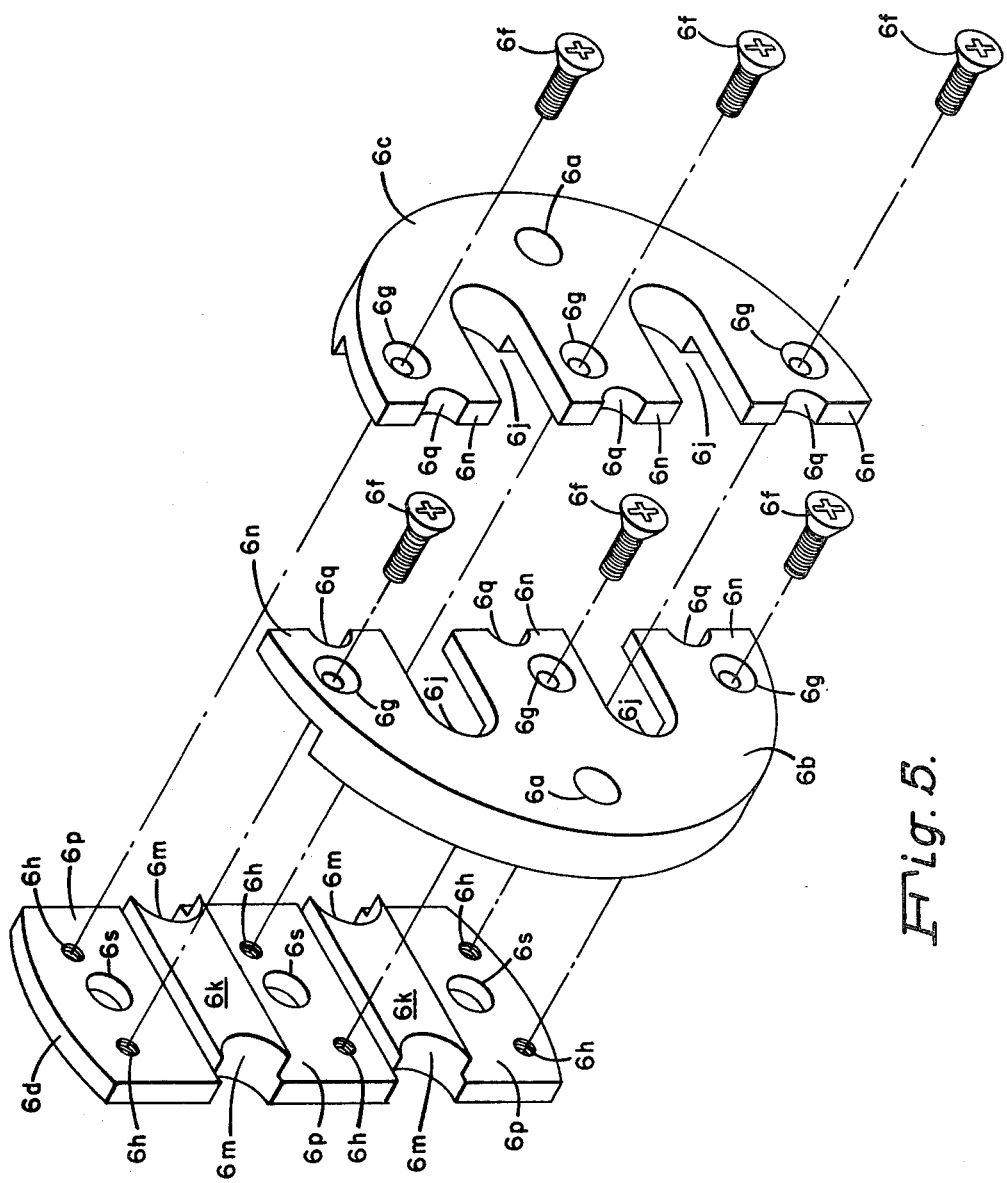
FIG. 5 is an exploded perspective view of the multi-section end plate of FIGS. 3 and 4.

As indicated in FIGS. 1-5, and especially FIG. 5, the front plate 6 generally comprises three interlocking sections, specifically, a pair of like end sections 6b and 6c and a central section 6d. The sections are usually maintained as separate, discrete parts until such time as the assembly 1 is to be inserted into the conduit 3 at which time, and as will be explained in greater detail hereinafter, the three sections 6b, 6c and 6d are caused to be assembled together. The actual physical assembly and interconnection of the three sections 6b, 6c and 6d is accomplished by the use of a plurality of small, short threaded screws 6f which are inserted into unthreaded openings 6g provided in the end sections 6b and 6c and threaded into corresponding threaded openings 6h provided in the central section 6d. The sections 6b, 6c and 6d also serve, when interconnected together as described, and as most clearly shown in FIGS. 3 and 4, to define a plurality of equi-spaced openings 6i. These openings are used for the receipt therein and longitudinal passage therethrough of the aforementioned elongated members 2. The openings 6i are specifically defined, as best shown in FIG. 5, by a plurality of elongated arcuate cutouts or slots 6j formed in the end sections 6b and 6c, and a pair of spaced-apart portions 6k formed in the section 6d and having semi-circular cutouts 6m at the opposing ends thereof. When the three sections 6b, 6c and 6d are interconnected together in the general manner indicated in FIG. 5, the semi-circular cutouts 6m of the portions 6k of the central section 6d combine with the arcuate cutouts 6j of the end sections 6b and 6c to form a total of four openings 6i (see FIGS. 3 and 4). It will further be noted that when the three sections 6b, 6c and 6d are completely assembled together, portions of the end sections 6b and 6c, designed as 6n in FIG. 5, abut against each other and overlie and cover portions 6p of the central section 6d. Since the portions 6n of the end sections 6b and 6c are of the same thickness as the portions 6k of the central section 6d, and since the three sections 6b, 6c and 6d all have the same overall thickness, the front and rear surfaces of the plate 6 formed from the assembly of the three sections are both completely flat.

Figures 3, 4:
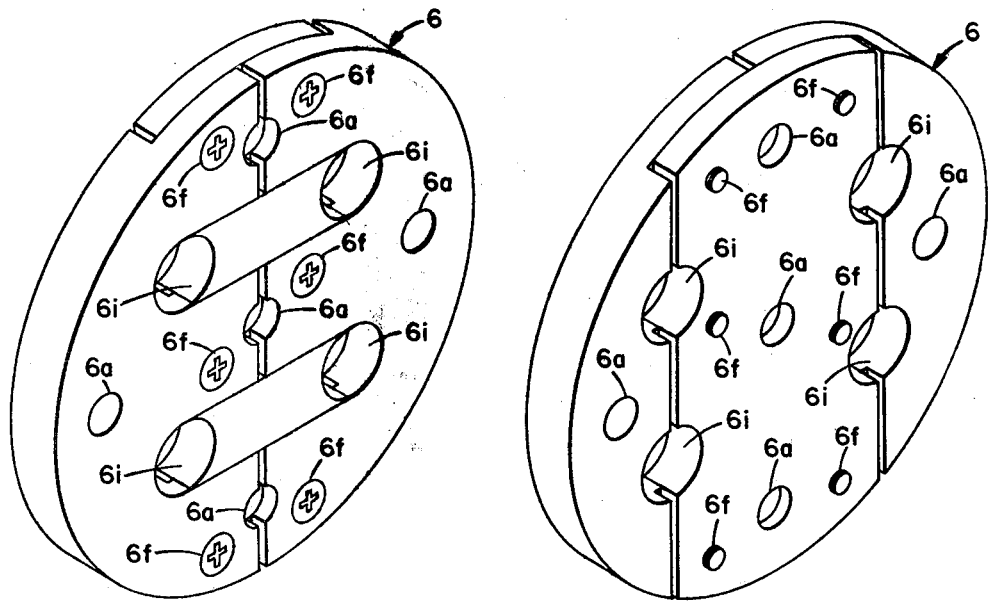
FIGS. 3 and 4 are front and rear views, respectively, of a multi-section end plate used by the sealing assembly in accordance with the present invention.

The above-mentioned portions 6n of the end sections 6b and 6c further have semi-circular unthreaded openings 6q formed at their edges which combine with each other and with unthreaded openings 6s provided in the portions 6p of the central section 6d (when the three sections 6b, 6c and 6d are joined together) to form a total of three of the aforementioned threaded openings 6a (see FIGS. 3 and 4). The three openings 6a are used, together with an additional pair of the unthreaded openings 6a formed directly in the end sections 6b and 6c as shown in FIGS. 1 and 3-5, to receive the aforementioned threaded bolts 9.

The three sections 6b, 6c and 6d as described hereinabove can be formed of any suitable material, for example, of a cast or machined metal (e.g., stainless steel) or of an injection molded plastic.

Figure 6:
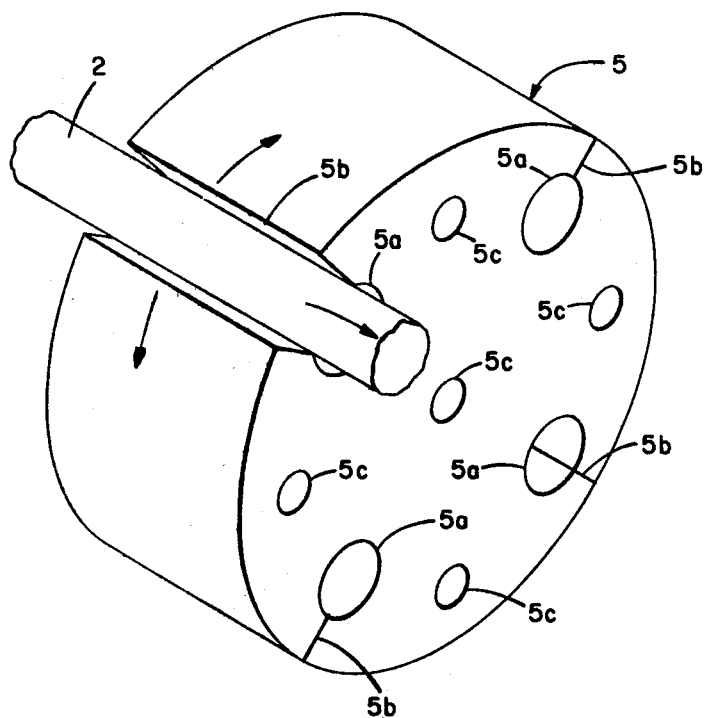
FIG. 6 illustrates the manner in which a cable or tube is disposed within a rubber bushing used in the sealing assembly in accordance with the present invention.

The various components of the sealing assembly 1 as described above, including the bushing 5 sandwiched between the front and rear plates 6 and 7, are assembled together with respect to each other and to the plurality of elongated members 2 and the conduit 3 in the following manner. The elongated members 2 are first caused to pass through the conduit 3 to their desired, ultimate destination, which may be nearby to the open end of the conduit 3 from which the members 2 emerge or a great distance away. The radial slots 5b in the bushing 5 are then widened as generally indicated in FIG. 6 to permit the forced radial entry of the elongated members 2 into the openings 5a in the bushing 5. This latter operation is especially important and convenient if the connecting ends of the elongated members 2 are to have a remote destination since the radial entry of the members 2 into the bushing 5 completely obviates the need for end feeding of the members 2. The various individual sections of the front and rear plates 6 and 7 are then arranged with respect to the opposing sides of the bushing 5 and the elongated members 2 so that the sections combine to provide the openings 6i and 7i in which the members 2 are received and retained. The multi-sectioning and on-site assembly of the multiple sections of the end plates 6 and 7 again eliminates the need for end feeding the elongated members 2. The various sections of the end plates 6 and 7 are then secured together by use of the small threaded screws (6f for the plate 6) in the manner as previously described in detail in connection with the end plate 6 and FIGS. 3–5. After the plates 6 and 7 have been assembled together, the bolts 9 are inserted through the unthreaded openings 6a in the front plate 6, the aligned unthreaded openings 5c in the bushing 5, and then threaded part way into the aligned threaded openings 7a in the rear plate 7. The arrangement of the bushing 5 and the plates 6 and 7 is then pushed into the conduit 3 by way of its open end until the assembly is completely within the conduit 3 and adjacent to the open end of the conduit 3. The bolts 9 are then threaded completely into the openings 7a in the rear plate 7, causing the plates 6 and 7 to be drawn toward each other and causing the bushing 5 to be compressed longitudinally between and against the inside surfaces of the plates 6 and 7. As the bushing 5 is compressed by the foregoing action, the bushing expands outwardly at its perimeter against the inside surface of the conduit 3, establishing a very tight friction fit and seal with the conduit 3. Essentially simultaneously, the bushing 5 contracts around the elongated members 2 to provide very tight fits and seals around the members 2. The seals established between and around the members 2 and the conduit 3 are water-tight and, because of the solid and substantial nature of the components of the assembly 1, there is little likelihood of penetration of the sealing assembly by pests such as rodents and insects. The sealing assembly 1 may also be readily dis-assembled at any time, without damage thereto, for re-routing or relocating the elongated members 2 or for making repairs to the members 2. It will further be appreciated that if a particular application requires fewer than the four elongated members 2 shown in the drawing, the blank openings in the assembly 1 may be readily filled with dummy members (not shown). Further, the bushing 5 and the plates 6 and 7 can be readily modified to accept more (or fewer) than the four members 2 shown in the drawing by simply providing additional (or fewer) openings in the bushing 5 and appropriately modifying the plates 6 and 7 to accommodate the selected number of members.

While there has been described what is considered to be the preferred embodiment of the invention, it will be apparent to those skilled in the art that various changes and modifications may be made therein without departing from the invention as called for in the appended claims.

What is claimed is:

1. A mechanical sealing assembly for establishing a seal between a plurality of elongated members and a hollow enclosure conducting said elongated members, comprising:

a bushing of a resilient, compressible material having a plurality of receiving openings extending therethrough and a plurality of slots extending from and between the perimeter of the bushing and the receiving openings, said slots being arranged to be widened for permitting a plurality of elongated members conducted along the hollow enclosure to be inserted into, and to lie longitudinally within and pass through, the receiving openings, said bushing having a shape generally conforming to the interior configuration of the hollow enclosure;

first and second plates adapted following the insertion of the elongated members into the receiving openings in the bushing to be positioned on opposite sides of the bushing thereby to sandwich the bushing between the plates, each of said plates comprising a plurality of interconnecting sections arranged to surround the elongated members and defining openings corresponding to the receiving openings in the bushing for the receipt therein and passage therethrough of the elongated members, the sandwich assembly of said first and second plates and the bushing having the elongated members passing therethrough being adapted to be inserted into the enclosure; and compression means operative following insertion of the aforesaid sandwich assembly into the enclosure to compress longitudinally the bushing between the first and second plates by an amount to cause the bushing to expand outwardly at its perimeter thereby to effect a seal therebetween and the enclosure and to cause the bushing to contract around the elongated members thereby to effect seals between the bushing and the elongated members.

2. A mechanical sealing assembly in accordance with claim 1 wherein:

the hollow enclosure is an elongated cylindrical enclosure having a circular cross section;

the elongated members are cylindrical members having generally circular cross sections;

the bushing has a circular cross section and a diameter in its non-compressed state slightly less than the internal diameter of the enclosure; and the receiving openings in the bushing are circular openings.

3. A mechanical sealing assembly in accordance with claim 2 wherein:

the bushing is of a cylindrical configuration; and the slots extending from and between the perimeter of the bushing and the receiving openings are radial slots in a direction toward the center of the bushing.

4. A mechanical sealing assembly in accordance with claim 2 wherein:

the bushing is of a compressible rubber material.

5. A mechanical sealing assembly in accordance with claim 2 wherein:

the receiving openings in the bushing are equi-distant from the center of the bushing and spaced equally from each other.

6. A mechanical sealing assembly in accordance with claim 5 wherein:

the bushing is of a compressible rubber material and has a cylindrical configuration; and the slots extending from and between the perimeter of the bushing and the receiving openings are radial slots in a direction toward the center of the bushing.

7. A mechanical sealing assembly in accordance with claim 6 wherein:
the bushing is of a silicone rubber material.

8. A mechanical sealing assembly in accordance with claim 1 wherein:
the bushing has an additional plurality of openings extending therethrough; and
the first and second plates each have a like plurality of openings extending therethrough and adapted to be aligned with the additional plurality of openings in the bushing when the sandwich assembly of the bushing and the first and second plates are arranged for insertion into the enclosure;
and wherein the compression means includes:
a plurality of fasteners utilized in connection with the aligned openings in the first and second plates and the bushing to draw the first and second plates toward each other for compressing the bushing longitudinally between the first and second plates.

9. A mechanical sealing assembly in accordance with claim 8 wherein:
the openings in the first plate are unthreaded openings and the openings in the second plate are threaded openings; and
the fasteners are threaded bolts arranged to pass through the aligned openings in the first plate and the bushing and to thread into the threaded openings in the second plate.

10. A mechanical sealing assembly in accordance with claim 8 wherein:
the hollow enclosure is an elongated cylindrical enclosure having a circular cross section;
the elongated members are cylindrical members having generally circular cross sections;
the bushing has a circular cross section and a diameter in its non-compressed state slightly less than the internal diameter of the enclosure; and
the receiving openings in the bushing are circular openings.

11. A mechanical sealing assembly in accordance with claim 10 wherein:
the bushing has a cylindrical configuration and first and second opposing, flat faces; and
the first and second plates are flat plates adapted following the insertion of the elongated cylindrical bushing to be placed on opposite sides of the bushing in direct physical contact with the opposing, flat faces of the bushing.

12. A mechanical sealing assembly in accordance with claim 11 wherein:
the openings in the first plate are unthreaded openings and the openings in the second plate are threaded openings; and
the fasteners are threaded bolts arranged to pass through the aligned openings in the first plate and the bushing and to thread into the threaded openings in the second plate.

13. A mechanical sealing assembly in accordance with claim 12 wherein:
the bushing is of a compressible rubber material.

14. A mechanical sealing assembly in accordance with claim 1 wherein each of the first and second plates comprises:
first and second end sections including a plurality of slots; and
a central section adapted to be positioned intermediate to, and to be physically interlocked with, the end sections when the first and second plates are to be positioned on opposite sides of the bushing and including portions cooperating with the slots in the end sections to define a plurality of openings for passage therethrough of the elongated members.

15. A mechanical sealing assembly in accordance with claim 14 wherein:
the bushing has an additional plurality of openings extending therethrough;
the end and central sections of the first plate collectively have an additional plurality of openings therein when said sections are interconnected together;
the end and central sections of the second plate collectively have an additional plurality of openings therein when said sections are interconnected together;
the additional pluralities of openings in the bushing and plates being adapted to be aligned with each other when the sandwich assembly of the bushing and the plates are arranged for insertion into the enclosure;
and wherein the compression means includes:
a plurality of fasteners utilized in connection with the aligned openings in the first and second plates and the bushing to draw the first and second plates toward each other for compressing the bushing longitudinally between the first and second plates.

16. A mechanical sealing assembly in accordance with claim 15 wherein:
the openings in the first plate are unthreaded openings and the openings in the second plate are threaded openings; and
the fasteners are threaded bolts arranged to pass through the aligned openings in the first plate and the bushing and to thread into the threaded openings in the second plate.

17. A mechanical sealing assembly in accordance with claim 15 wherein:
the hollow enclosure is an elongated cylindrical enclosure having a circular cross section;
the elongated members are cylindrical members having generally circular cross sections;
the bushing has a circular cross section and a diameter in its non-compressed state slightly less than the internal diameter of the enclosure; and
the receiving openings in the bushing are circular openings.

18. A mechanical sealing assembly in accordance with claim 17 wherein:
the bushing has a cylindrical configuration and first and second opposing, flat faces; and
the sections of the first and second plates are arranged when interconnected together to form first and second plates which are flat, said flat plates being adapted following the insertion of the elongated cylindrical members into the receiving openings in the cylindrical bushing to be placed on opposite sides of the bushing in direct physical contact with the opposing, flat faces of the bushing.

19. A mechanical sealing assembly in accordance with claim 18 wherein:
the bushing is of a compressible rubber material.

20. A mechanical sealing assembly in accordance with claim 19 wherein:
the openings in the first plate are unthreaded openings and the openings in the second plate are threaded openings; and
the fasteners are threaded bolts arranged to pass through the aligned openings in the first plate and the bushing and to thread into the threaded openings in the second plate.

* * * * *

UNITED STATES PATENT AND TRADEMARK OFFICE
CERTIFICATE OF CORRECTION

PATENT NO. : 4,377,291

DATED : March 22, 1983

INVENTOR(S) : Francis G. Albertini

It is certified that error appears in the above-identified patent and that said Letters Patent is hereby corrected as shown below:

Title page, first column, line 7,
"(22) Filed: Jan. 15, 1982" should read
-- (22) Filed: April 15, 1982 --.

Signed and Sealed this

Twenty-first Day of June 1983

[SEAL]

Attest:

DONALD J. QUIGG

*Attesting Officer*      *Acting Commissioner of Patents and Trademarks*